United States Patent
Badders, Jr.

(10) Patent No.: US 6,305,073 B1
(45) Date of Patent: Oct. 23, 2001

(54) ONE-SIDED ELECTRODE ARRANGEMENT ON AN INTERMEDIATE SPACER FOR A TOUCHSCREEN

(75) Inventor: James Cameron Badders, Jr., Mukilteo, WA (US)

(73) Assignee: GM Nameplate, Inc., Seattle, WA (US)

( * ) Notice: Subject to any disclaimer, the term of this patent is extended or adjusted under 35 U.S.C. 154(b) by 0 days.

(21) Appl. No.: 09/474,707

(22) Filed: Dec. 29, 1999

(51) Int. Cl.⁷ ............................................ H01H 11/00
(52) U.S. Cl. ............................................................ 29/622
(58) Field of Search ............................. 29/622; 200/5 A, 200/512–517, 86 R; 178/18.01–20.04

(56) References Cited

U.S. PATENT DOCUMENTS

| | | |
|---|---|---|
| 3,522,664 | 8/1970 | Lambright et al. . |
| 3,735,023 | 5/1973 | Hurst et al. . |
| 3,911,215 | 10/1975 | Hurst et al. . |
| 4,018,989 | 4/1977 | Snyder et al. . |
| 4,071,689 | 1/1978 | Talmage et al. . |
| 4,198,539 | 4/1980 | Pepper, Jr. . |
| 4,220,815 | 9/1980 | Gibson et al. . |
| 4,423,299 | 12/1983 | Gurol et al. . |
| 4,476,463 | 10/1984 | Ng et al. . |
| 4,625,075 | 11/1986 | Jaeger . |
| 4,661,655 | 4/1987 | Gibson et al. . |
| 4,672,153 | 6/1987 | Kikuchi . |
| 4,677,417 * | 6/1987 | Amagishi ...................... 200/86 R X |
| 4,694,126 * | 9/1987 | Aiken, Jr. et al. .................... 200/5 A |
| 4,696,860 | 9/1987 | Epperson . |
| 4,731,508 | 3/1988 | Gibson et al. . |
| 4,758,526 | 7/1988 | Thalheimer . |
| 4,795,861 * | 1/1989 | O'Rourke ............................. 200/5 A |
| 4,801,767 | 1/1989 | Sato et al. . |
| 4,818,827 * | 4/1989 | Ipcinski et al. ...................... 200/5 A |
| 4,864,084 * | 9/1989 | Cardinale ............................. 200/5 A |
| 4,897,511 | 1/1990 | Itaya et al. . |
| 4,958,148 | 9/1990 | Olson . |
| 4,977,397 | 12/1990 | Kuo et al. . |
| 5,062,916 * | 11/1991 | Aufderheide et al. ............... 156/269 |

(List continued on next page.)

*Primary Examiner*—J. R. Scott
(74) *Attorney, Agent, or Firm*—Christensen O'Connor Johnson Kindness PLLC (57) ABSTRACT

A membrane switch (10) is disclosed having a bottom membrane (12) with an upper conductive surface (16), a top membrane (14) with a lower conductive surface (18), and an intermediate spacer (20) disposed therebetween. The intermediate spacer includes a central aperture (24) and is formed of an intermediate substrate (21) having a lower surface (26) and an upper surface (28). First y-axis electrodes (30A, 30B) including first contact portions (31A, 31B) and second x-axis electrodes (34A, 34B) including second contact portions (38A, 38B) are both formed on the upper surface of the intermediate substrate. The intermediate spacer further includes an upper adhesive layer (45) including predefined first apertures (50) adapted to overlie the first contact portions of the y-axis electrodes and predefined second apertures (47) adapted to overlie the second contact portions of the x-axis electrodes, and a lower adhesive layer (43). Preferably after the intermediate spacer is assembled, at least one hole (39) is defined through each of the first contact portions, extending through the intermediate substrate and the lower adhesive layer. Then conductive epoxy material (41) is poured into the first aperture and the hole so as to provide an electrical conduction path between the first contact portion of the y-axis electrode and the lower adhesive layer. Similarly, conductive epoxy material is poured into the second aperture predefined through the upper adhesive layer so as to provide an electrical conduction path between the second contact portion of the x-axis electrode and the upper adhesive layer. When the intermediate spacer thus constructed is secured between the bottom and top membranes, the y-axis and x-axis electrodes are in electrical contact with the bottom and top membranes, respectively.

14 Claims, 8 Drawing Sheets

U.S. PATENT DOCUMENTS

| | | |
|---|---|---|
| 5,111,320 | 5/1992 | Wysocki et al. . |
| 5,133,810 | 7/1992 | Morizane et al. . |
| 5,147,468 | 9/1992 | Deguchi . |
| 5,228,562 | 7/1993 | Burk . |
| 5,530,318 | 6/1996 | Ensign, Jr. et al. . |
| 5,565,733 | 10/1996 | Krafcik et al. . |
| 5,637,382 | 6/1997 | Kataoka et al. . |
| 5,844,506 | 12/1998 | Binstead . |
| 5,844,783 | 12/1998 | Kojima . |
| 5,869,790 | 2/1999 | Shigetaka et al. . |
| 5,896,127 | 4/1999 | Matsufusa et al. . |
| 6,069,313 | 5/2000 | Kay . |
| 6,132,818 | 10/2000 | Tanaka et al. . |

\* cited by examiner

ONE-SIDED ELECTRODE ARRANGEMENT ON AN INTERMEDIATE SPACER FOR A TOUCHSCREEN

FIELD OF THE INVENTION

The present invention relates to two-dimensional coordinate location devices and, more particularly, to analog and digital touch-sensitive membrane switches and methods for fabricating the same.

BACKGROUND OF THE INVENTION

Touch-sensitive membrane switches have been incorporated into many electronic devices to enable operators to provide instructions to the device by selecting a corresponding horizontal and vertical coordinate location on the membrane switch. For example, membrane switches are often installed over the viewing screen of a cathode ray tube. The user of a device including such a "touchscreen" is able to operate the device by pointing to and depressing a particular location on the screen corresponding to a desired menu selection. The touchscreen then generates a voltage signal corresponding to the horizontal ("x") and vertical ("y") coordinates of that location. For such an application, the layers used to fabricate the membrane switch are transparent.

Other conventional applications for membrane switches are numeric and function keypads on diverse electronic items, such as microwaves, television sets, calculators, medical instrumentation, and various other devices. Membrane switches may be designed for manual finger or stylus depression for operation. The range of applications for membrane switches is ever increasing, as is the need for producing low-cost membrane switches.

One type of conventional membrane switch, often used for touch-sensitive screens, is the analog membrane switch. The membrane switch comprises a sandwich of top and bottom membranes with at least the top membrane being made from a flexible material. More typically, both membranes are made from flexible dielectric sheets. One surface of each membrane is coated with a semiconductive resistive layer, such as indium tin oxide ("ITO"), or a conductive layer such as gold.

Construction and operation of conventional membrane switches is well known in the art. One method of constructing an analog membrane switch is described in U.S. Pat. No. 5,228,562 to Burk. The membrane switch includes a flexible top membrane having a lower conductive surface; a lower membrane having an upper conductive surface; and an intermediate spacer disposed therebetween. The intermediate spacer includes a central rectangular aperture, and has upper and lower opposite surfaces. One or more first (y-axis) electrodes are formed on the upper surface of the intermediate spacer along a set of parallel edges, and one or more second (x-axis) electrodes are applied on the lower surface of the intermediate spacer along another set of parallel edges. The electrodes are applied, typically, by silkscreening with a conductive ink.

A random or fixed array of small raised dielectric projections is deposited on the upper surface of the lower membrane. Next, conductive adhesive is applied between the intermediate spacer and the top and bottom membranes to secure the intermediate spacer in place with the x- and y-axis electrodes in electrical contact with the top and bottom membranes, respectively. At this point, the raised dielectric projections are positioned within the rectangular aperture of the intermediate spacer, normally maintaining the lower conductive surface of the top membrane separated from the upper conductive surface of the lower membrane.

However, when the top membrane is depressed through the central aperture of the intermediate spacer, it contacts the bottom membrane between the projections. The x and y coordinate locations of this point of depression can be obtained by monitoring voltage drops across the electrodes. Typically, a uniform potential, such as 5 volts, is first applied across a first set of electrodes formed on the upper surface of the intermediate spacer while the voltage drop across the second set of electrodes on the lower surface of the intermediate spacer is monitored. This voltage corresponds to the horizontal, or "x" coordinate of the depression pointer. This arrangement is then switched, with a potential applied across the second set of electrodes and the voltage drop across the first set of electrodes being monitored to determine the vertical, or "y" coordinate. Monitoring of first and second sets of electrodes oscillates in this manner so that both the x and y coordinates of a depression point can be rapidly measured when such a depression occurs. Other voltage monitoring methods may be used to obtain similar results.

The method of producing a membrane switch as described above is advantageous in that many of the processing steps, such as application of electrodes, are performed on the intermediate spacer, reducing the opportunities for scratching or marring the fragile conductive coating formed on the top and lower membranes. However, the method is rather cumbersome because it requires application of electrodes on both upper and lower surfaces of the intermediate spacer. To this end, the intermediate spacer needs to be flipped over after one of its surfaces is applied with a set of electrodes, and the intermediate spacer's position needs to be carefully adjusted for precise alignment and secured before its other surface is applied with another set of electrodes. With such careful adjustment, however, application of electrodes on both sides of an intermediate spacer and possible misalignment of the electrodes often result in a final membrane switch product that is not reliable.

SUMMARY OF THE INVENTION

The present invention provides a membrane switch, and method for producing the same, which significantly reduce the amount of labor required to produce an intermediate spacer, to improve overall production efficiency of a membrane switch. Furthermore, the present invention improves the overall reliability of a membrane switch.

The membrane switch comprises a first substrate having a first electrically conductive surface; a flexible second substrate having a second electrically conductive surface; and an intermediate spacer defining a central aperture and being formed of a dielectric intermediate substrate having a third, lower surface and a fourth, upper surface. One or more first electrodes having a first contact portion are formed on the upper surface of the intermediate substrate. Further, one or more second electrodes having a second contact portion are formed on the upper surface of the intermediate substrate.

The intermediate substrate provided with the first and second electrodes is sandwiched between a first adhesive layer, which is applied to the lower surface of the intermediate substrate, and a second adhesive layer, which is applied to the upper surface of the intermediate substrate. The second adhesive layer defines one or more first apertures, which are adapted to overlie the first contact portions of the first electrodes provided on the upper surface of the intermediate substrate. The second adhesive layer further includes one or more second apertures, which are adapted to overlie the second contact portions of the second electrodes provided on the upper surface of the intermediate substrate. The second apertures are filled with conductive epoxy material so as to provide an electrical conduction path between the second contact portions and the second adhesive layer. Each of the one or more first contact portions defines a hole extending therethrough between the intermediate substrate and the first adhesive layer. The hole has a cross-sectional area that is smaller than that of the first contact portion. The first aperture through the second adhesive layer and the hole through the intermediate substrate and the first adhesive layer are then filled with conductive epoxy material so as to provide an electrical conduction path between the first contact portion and the first adhesive layer.

The intermediate spacer thus constructed is then secured between the first surface of the first substrate and the second surface of the second substrate, such that the first and second electrodes are in electrical contact with the first and second conductive surfaces, respectively. The second substrate is depressible through the central aperture of the intermediate spacer to contact the first substrate.

In one aspect of the present invention, the intermediate spacer is secured between the first substrate and the second substrate using adhesive layers in the form of films. To assist in proper placement of the various layers used in the intermediate spacer, the dielectric intermediate substrate and the adhesive layers may be assembled together prior to cutting the intermediate spacer to define the central aperture therein.

In another aspect of the present invention, the first and second conductive surfaces of the first and second substrates include conductive bus bars that are formed of material having less resistivity than the material forming the conductive surfaces. The bus bars extend over the length of the conductive surfaces, so as to enhance uniform electrical conduction across the conductive surfaces, thereby improving the linearity of the membrane switch.

In yet another aspect of the present invention, the intermediate spacer further includes one or more dielectric layers applied over the upper surface of the intermediate substrate without covering the first and/or second contact portions to insulate the first and second electrodes, depending on the space available on the intermediate substrate to accommodate the first and second electrodes.

The membrane switch of the present invention and method for producing the same result in a significant decrease in the amount of labor required to produce an intermediate spacer and, hence, a membrane switch. Because both x-axis and y-axis electrodes are applied on the same side of a third, intermediate substrate to form an intermediate spacer, the present method eliminates the labor formerly required to apply electrodes on both sides of an intermediate substrate. As a result, a significant increase in overall production efficiency in the manufacturing of a membrane switch is achieved. Furthermore, because the present method of producing a membrane switch applies all electrodes on the same side of an intermediate substrate without having to flip the substrate over, the method improves the reliability of a final membrane switch product.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
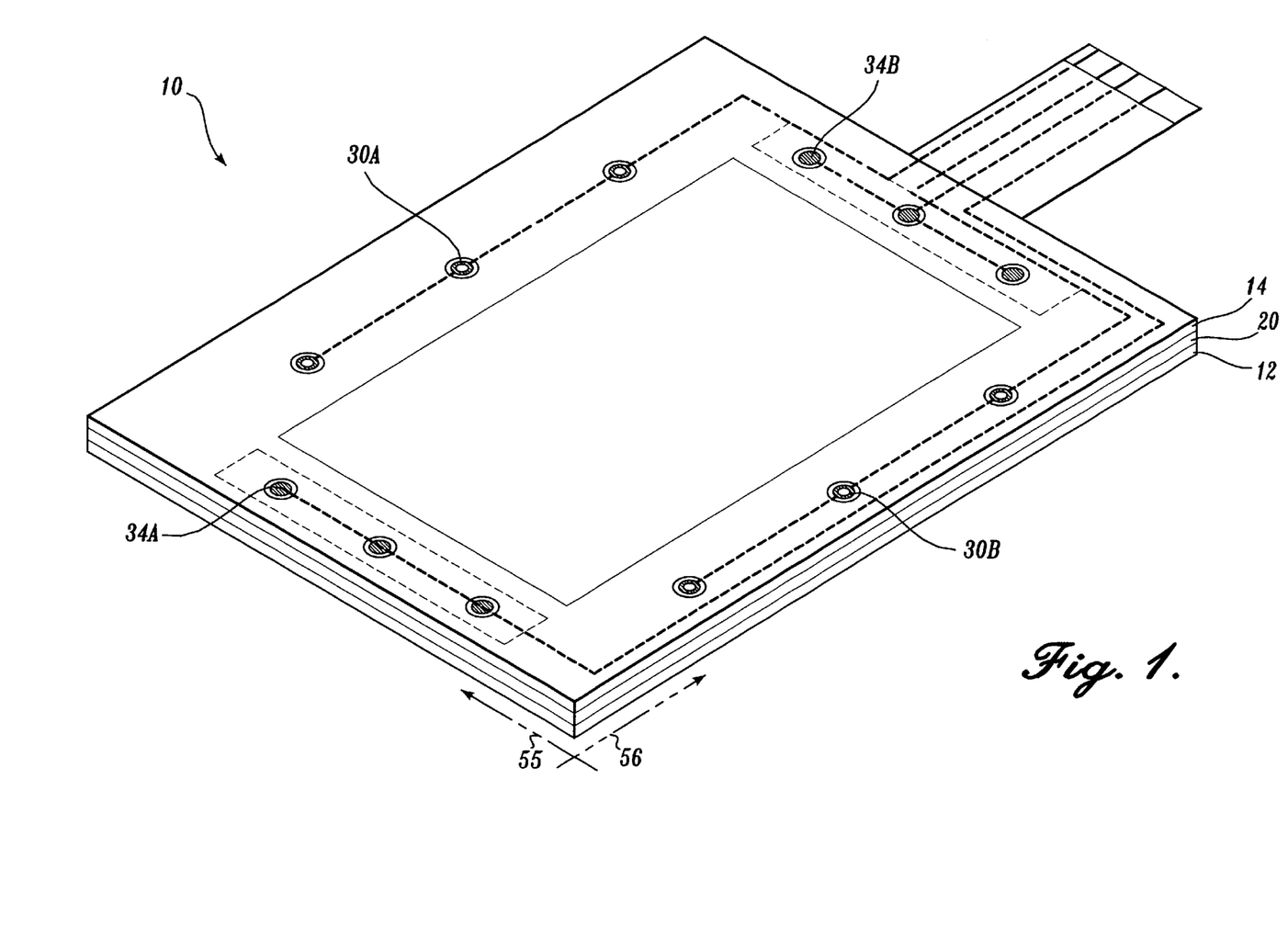
FIG. 1 provides a pictorial view of an analog membrane switch constructed in accordance with the present invention.
Figure 2:
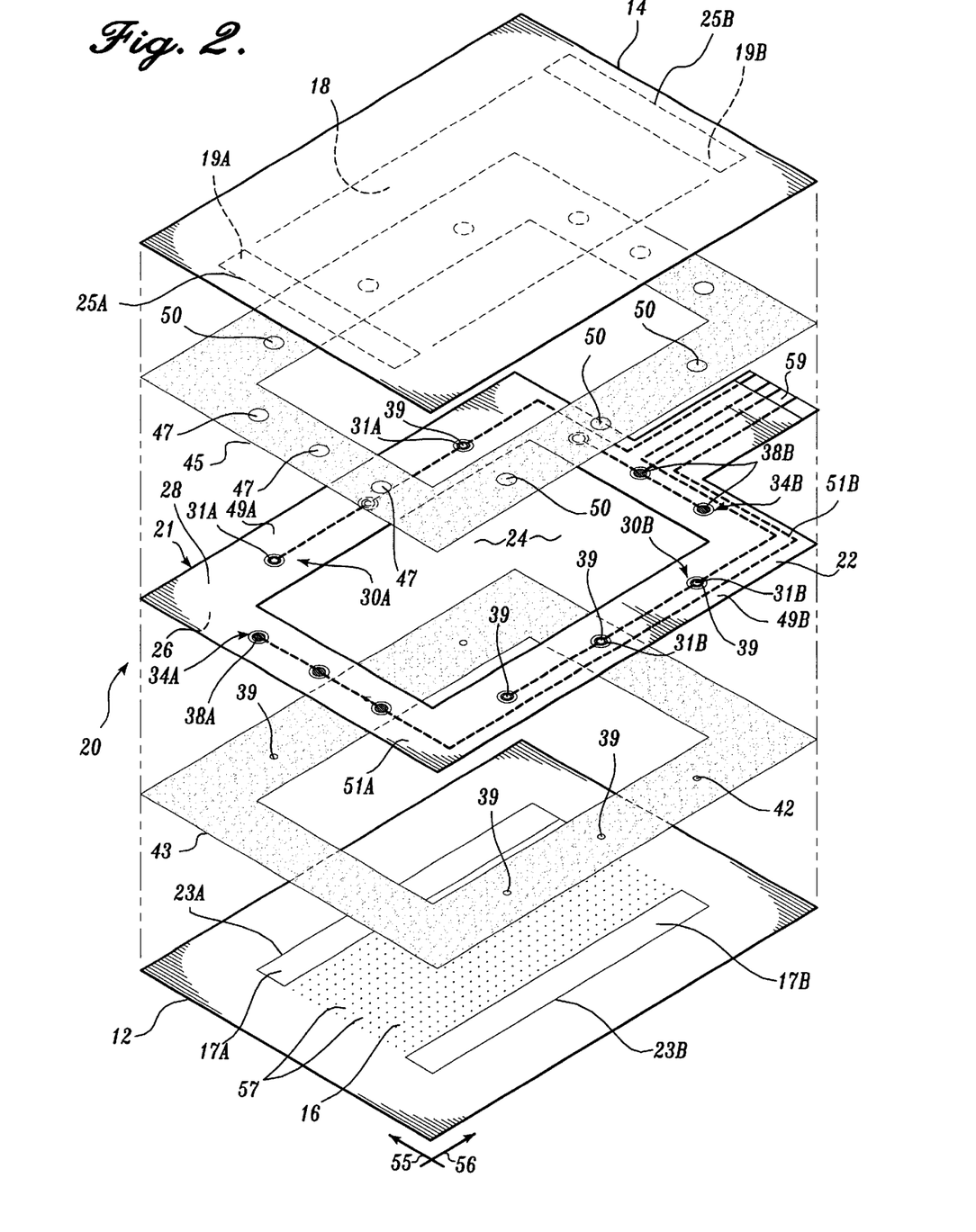
FIG. 2 provides an exploded view of the analog membrane switch of FIG. 1.

Referring to FIGS. 1 and 2, an analog membrane switch 10 is shown, such as would be used for a touchscreen. The membrane switch 10 includes a first substrate, such as a bottom membrane 12, and a second flexible substrate, such as a top membrane 14. A first, upper surface 16 of the bottom membrane 12 and a second, lower surface 18 of the second membrane 14 are conductive. An intermediate spacer 20 is disposed between the bottom and top membranes 12 and 14. The intermediate spacer 20 comprises a third, intermediate substrate 21, made of dielectric material, which includes a frame portion 22 circumscribing a large rectangular central aperture 24. The intermediate substrate 21 includes a third, lower surface 26 and a fourth, upper surface 28. At least one first, or y-axis electrode 30A, 30B, each including at least one first contact portion 31A, 31B, is provided on the upper surface 28 of the intermediate substrate 21. Further, at least one second, or x-axis electrode 34A, 34B, each including at least one second contact portion 38A, 38B, is provided on the upper surface 28. The intermediate spacer 20 further includes a first, lower adhesive layer 43 applied to the lower surface 26 of the intermediate substrate 21, and a second, upper adhesive layer 45 applied to the upper surface 28 of the intermediate substrate 21. The upper adhesive layer 45 defines at least one first aperture 50, which is sized and shaped to overlie the at least one first contact portion 31A, 31B of the y-axis electrodes 30A, 30B provided on the upper surface 28 of the intermediate substrate 21. The upper adhesive layer 45 also defines at least one 30 second aperture 47, which is sized and shaped to overlie the at least one second contact portion 38A, 38B of the x-axis electrodes 34A, 34B provided on the upper surface 28 of the intermediate substrate 21. In a preferred embodiment, the intermediate substrate 21 and the lower and upper adhesive layers 43, 45 are assembled together and, then, at least one hole 39 extending through the at least one first contact portion 31A, 31B of the y-axis electrodes 30A, 30B, through the intermediate substrate 21 and the lower adhesive layer 43, is defined. The hole 39 has a cross-sectional area that is smaller than that of the first contact portion 31A, 31B. Thereafter, conductive epoxy material 41 is poured into each first aperture 50 and hole 39 so as to provide an electrical conduction path between the first contact portion 31A, 31B and the lower adhesive layer 43. Conductive material is also poured into the aperture 47 that overlies the second contact portion 38A, 38B so as to provide an electrical conduction path between the second contact portion and the upper adhesive layer 45.

The intermediate spacer 20 thus constructed is then secured between the upper conductive surface 16 of the bottom membrane 12 and the lower conductive surface 18 of the top membrane 14. At this time, the lower adhesive layer 43 of the intermediate spacer 20 is associated with the upper conductive surface 16 of the bottom membrane 12 to maintain the y-axis electrodes 30A, 30B in electrical contact with the upper conductive surface 16, and the upper adhesive layer 45 of the intermediate spacer 20 is associated with the lower conductive surface 18 of the top membrane 14 to maintain the x-axis electrodes 34A, 34B in electrical contact with the lower conductive surface 18. In operation, a user may depress the top membrane 14 through the central aperture 24 of the intermediate spacer 20 to contact the bottom membrane 12 to activate the membrane switch 10.

As used herein, the first substrate is referred to as the "bottom" membrane 12, while the flexible second substrate is described as the "top" membrane 14, with descriptions of upper and lower surfaces and other components corresponding to these labels. However, no limitation is implied by this, and it should be understood that the membrane switch 10 of the present invention can be disposed in any fashion, such as standing upright on one side. Additionally, the membrane switch 10 is described and illustrated as being rectangular in configuration with a vertical y-axis 56 and a horizontal x-axis 55. However, membrane switches can be constructed in accordance with the present invention with other configurations, such as squares, or curvilinear shapes and, further, may have a nonplanar configuration. Also, these denotations of the x- and y-axes are provided for illustrative purposes only, and the membrane switch 10 can be disposed in other orientations.

The arrangement of the conductive surfaces and electrodes of the analog membrane switch 10 is well known in the art, and is the same as that for conventionally constructed analog membrane switches. However, in contrast to conventional analog membrane switches, in the present invention, the y-axis and x-axis electrodes 30A, 30B, 34A, 34B are formed on the same side of the intermediate substrate 21, rather than on both sides of the intermediate substrate 21 or on the bottom and top membranes 12, 14.

The construction of each component of the membrane switch 10 is now described. The top membrane 14 is preferably constructed from a flexible, pliable dielectric material, such as a polyester plastic film. The bottom membrane 12 may be constructed from any dielectric material, and need not be flexible. Thus, rigid sheets of plastic or glass can be utilized. However, a second sheet of plastic film of the same type as the top membrane 14 may be utilized. If stiffening is desired, the bottom membrane 12 may be adhered to a rigid backing plate after assembly of the membrane switch 10. The upper surface 16 of the bottom membrane 12 and the lower surface 18 of the top membrane 14 are each preferably coated with a semiconductive, resistive material, such as indium tin oxide ("ITO"). However, other conductive coatings can be utilized, such as gold.

To form the bottom and top membranes 12 and 14, each membrane may be stamped or die-cut from a larger sheet of the conductive-coated dielectric material. An array of spaced-apart raised dielectric projections 57 is preferably deposited on the upper surface 16 of the bottom membrane 12 using conventional techniques, for normally separating the upper and lower conductive surfaces 16, 18. A suitable dielectric material for forming the projections is an acrylic polymer.

The conductive upper surface 16 of the bottom membrane 12 preferably includes a conductive bus bar 17A, 17B that extends along the length of each of the long side edges 23A, 23B of the upper conductive surface 16 of the bottom membrane 12. The bus bar 17A, 17B is formed of material that has less resistivity than the coating forming the upper conductive surface 16 of the bottom membrane 12. For example, the bus bar can be formed by silk-screening silver, silver-carbon blend, nickel, or gold ink to the upper conductive surface 16 formed of ITO. The bus bars 17A, 17B are arranged so that they directly underlie and electrically connect with the first contact portions 31A, 31B of the y-axis electrodes 30A, 30B when the bottom membrane 12 is assembled with the intermediate spacer 20. Similarly, the lower conductive surface 18 of the top membrane 14 preferably includes a conductive bus bar 19A, 19B that extends along each of the short side edges 25A, 25B of the lower conductive surface 18 of the top membrane 14. As before, the bus bars 19A, 19B are formed of material having less resistivity than the coating forming the lower conductive surface 18 of the top membrane 14. The bus bars 19A, 19B are arranged so as to overlie and electrically connect with the second contact portions 38A, 38B of the x-axis electrodes 34A, 34B when the top membrane 14 is assembled with the intermediate spacer 20. Because the bus bars 17A, 17B, 19A, 19B are less resistive than the conductive surfaces 16, 18, any electric potential applied to the x- or y-axis electrodes 30A, 30B, 34A, 34B is first evenly spread over the entire length of the bus bars 17A, 17B, 19A, 19B and then is applied uniformly over the conductive surfaces 16, 18, thereby improving the linearity of the membrane switch 10.

Next, construction of the intermediate spacer 20 is described. The intermediate substrate 21 of the intermediate spacer 20 is preferably constructed from a polyester dielectric film. This dielectric film may be the same as that used to construct the bottom and top membranes 12, 14. One grade of polyester film found to be suitable is available commercially under trade name MELINEX ST 507 from ICI Films of Wilmington, Del. Other dielectric polymer films can also be utilized. The frame portion 22 of the intermediate substrate 21 comprises a narrow border that circumscribes the central aperture 24. The intermediate spacer 20 further includes a tail portion 59 extending from one side of the frame portion 22 and projecting away from the central aperture 24. In the preferred embodiment illustrated, the tail portion 59 extends outwardly from the center of a short side 51B of the frame portion 22, away from the central aperture 24. The tail portion 59 provides a path for the y- and x-axis electrodes 30A, 30B and 34A, 34B to extend from the intermediate spacer 20 for connection to external circuitry. While in the preferred embodiment illustrated one tail portion 59 is provided, it should be apparent that other numbers and placements of tails would be possible. Thus, for example, two opposing tails can be provided with one tail carrying the x-axis electrode leads, and the other carrying the y-axis electrode leads.

The y-axis electrodes 30A, 30B are formed on long sides 49A, 49B of the intermediate substrate 21 on its upper surface 28. The y-axis electrodes are used to determine coordinates in the vertical, or y-axis 56, direction. The x-axis electrodes 34A, 34B are formed on short sides 51A, 51B of the intermediate substrate 21, also on its upper surface 28, and are used to determine the horizontal, or x-axis 55, coordinates.

Figure 3A:
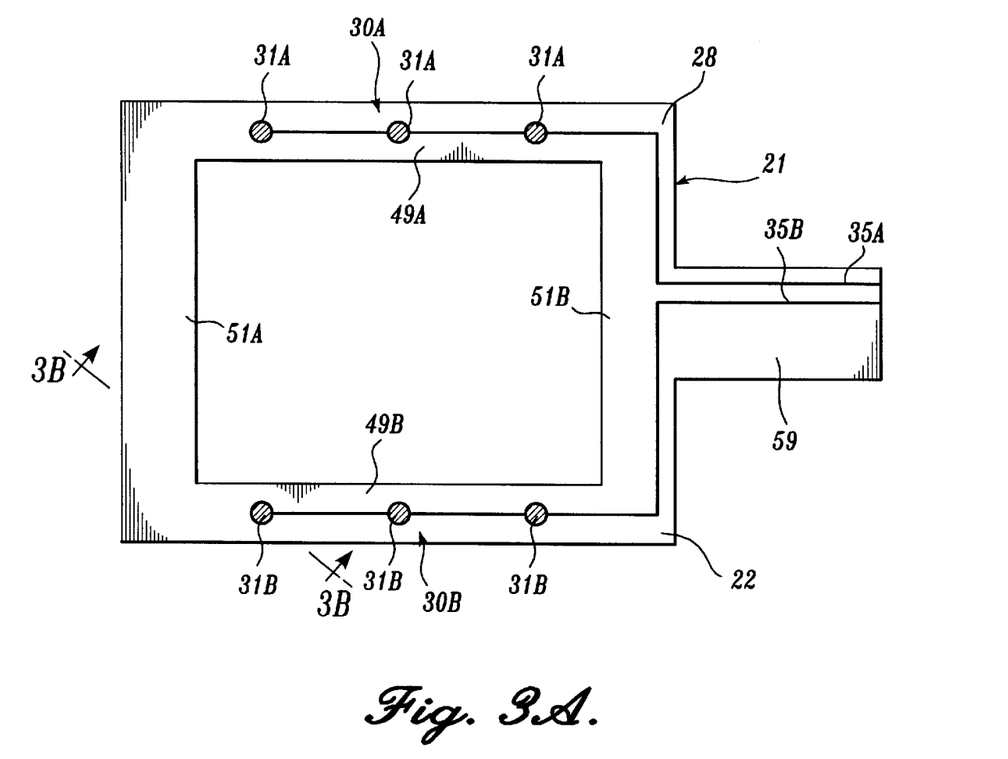
FIGS. 3A, 4A, 5A, 6A, and 7A provide step-by-step illustrations of a method of forming an intermediate spacer used in the analog membrane switch of FIG. 1.
Figure 3B:
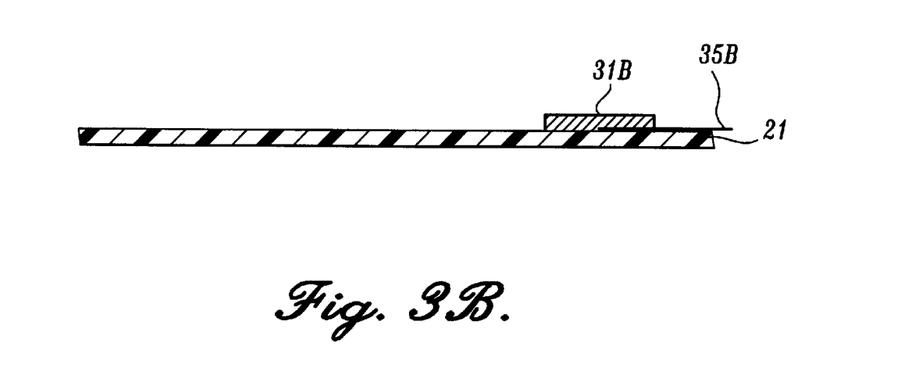
FIGS. 3B, 4B, 5B, 6B, and 7B are enlarged cross-sectional views taken across lines 3B—3B, 4B—4B, 5B—5B, 6B—6B, and 7B—7B of FIGS. 3A, 4A, 5A, 6A, and 7A, respectively.

Referring to FIGS. 3A–7B, steps taken in constructing the intermediate spacer 20 are described in detail. Referring to FIGS. 3A and 3B, two y-axis electrodes 30A, 30B are applied on the upper surface 28 of the intermediate substrate 21, for example, by silk-screening with conductive ink. One example of silver ink suitable for forming the electrodes in accordance with the present invention is Screen Printable Silver Conductive Ink 5007, available from Du Pont de Nemours of Wilmington, Del. However, it should be readily apparent that the electrodes could be applied by other conventional methods, e.g., by adhering copper strips onto the upper surface 28 of the intermediate substrate 21. Each of the y-axis electrodes 30A, 30B includes at least one first contact portion 31A, 31B disposed along the long sides 49A, 49B of the frame portion 22 of the intermediate substrate 21. Thus, the first contact portions 31A, 31B are disposed parallel to each other. In order to provide for an electrical connection between these first contact portions 31A, 31B and external circuitry, each y-axis electrode 30A, 30B further includes an electrically conductive 30 lead portion 35A, 35B that extends from the first contact portion 31A, 31B along the tail portion 59 of the intermediate spacer 20. The first contact portions 31A, 31B and the lead portions 35A, 35B of the y-axis electrodes 30A, 30B form continuous strips and are applied to the intermediate substrate 21 at the same time. The different portions 31A, 31B and 35A, 35B are referred to only for the purposes of understanding the function and treatment of the electrodes.

Figure 4A:
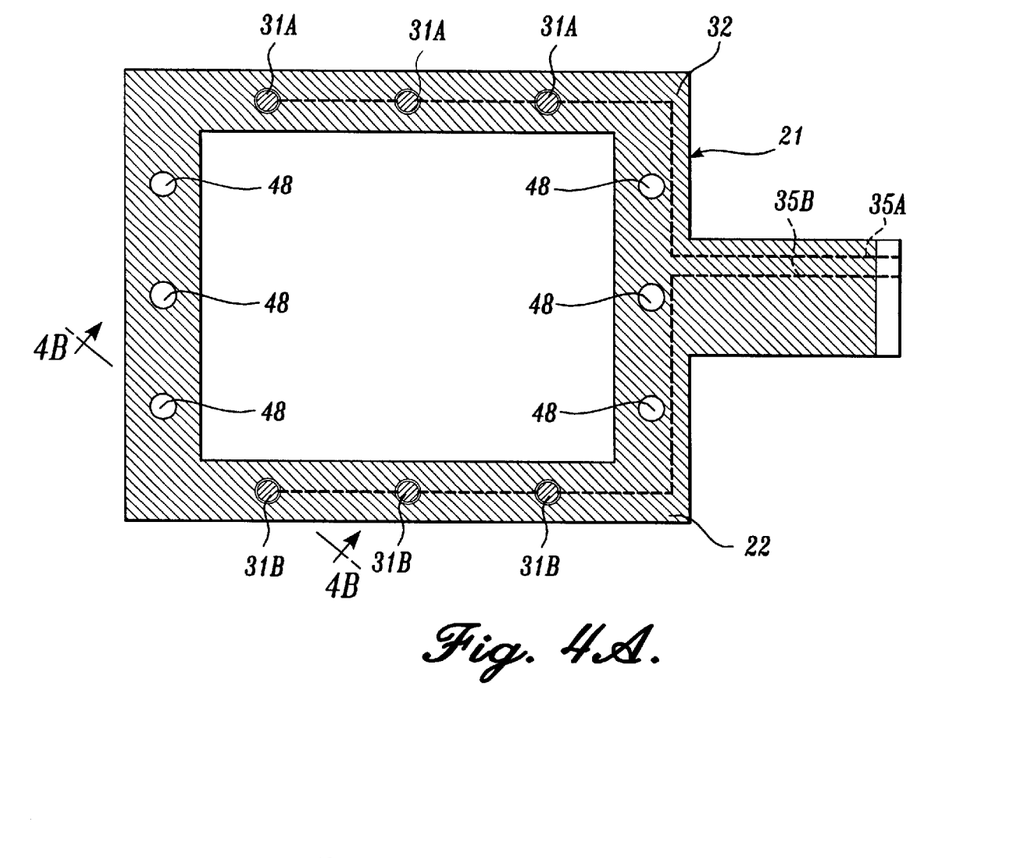
Figure 4B:
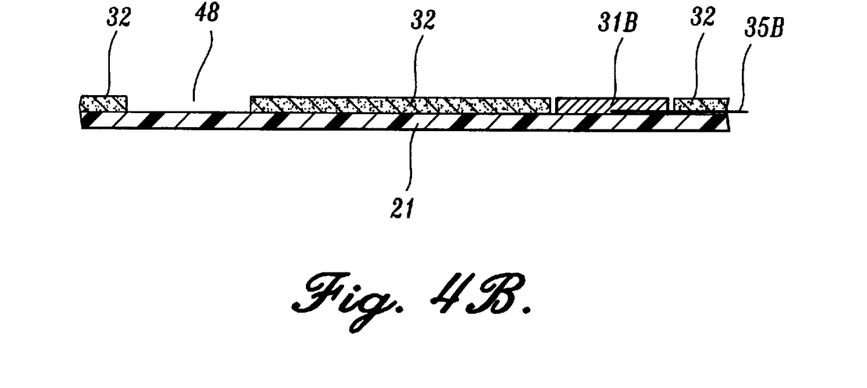

Thereafter, in FIGS. 4A and 4B, optionally, a dielectric layer 32 is formed over the upper surface 28 of the intermediate substrate 21 while leaving the first contact portions 31A, 31B exposed. This dielectric layer may be screen printed onto the intermediate substrate 21 using dielectric ink such as acrylic polymer. Alternatively, a separate film of dielectric material, such as a polyester, may be bonded to the intermediate substrate by heat bonding or adhesion. The dielectric layer 32 is applied, for example, to insulate the lead portions 35A, 35B of the y-axis electrodes 30A, 30B from the lead portions of the x-axis electrodes, to be described below, when the frame portion 22 of the intermediate substrate 21 does not have sufficient space to provide both the y-axis and x-axis electrodes without shorting. It should be understood, therefore, that application of the dielectric layer 32 is not necessary if enough space exists on the intermediate substrate 21.

Still referring to FIGS. 4A and 4B, it may also be preferable to apply the dielectric layer 32 over the upper surface 28 of the intermediate substrate 21 without covering at least one location 48 where the at least one second, x-axis electrode is to be applied. The benefit of not applying the dielectric layer over these locations 48 will be described below.

Figure 5A:
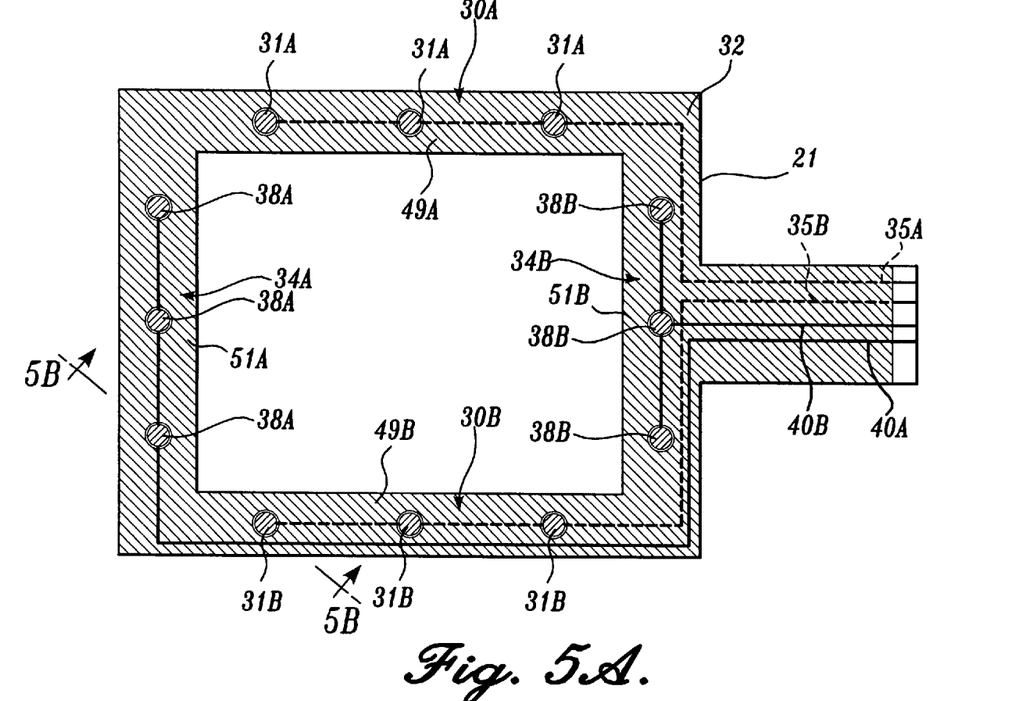
Figure 5B:
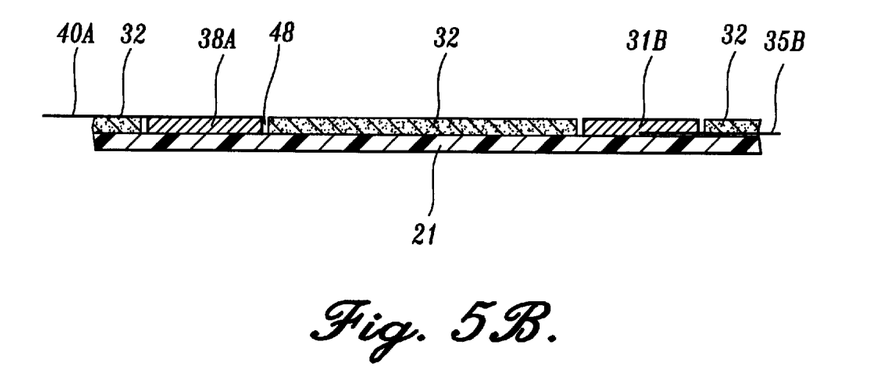

Next, referring to FIGS. 5A and 5B, two x-axis electrodes 34A, 34B are formed on the upper surface 28 of the intermediate substrate 21, in a manner similar to the y-axis electrodes 30A, 30B. Each of the x-axis electrodes 34A, 34B includes at least one second contact portion 38A or 38B, and a lead portion 40A or 40B. Again, these portions 38A, 38B and 40A, 40B are applied at the same time, and form continuous electrode strips. The second contact portions 38A of the x-axis electrode 34A extend along the length of the short side 51A of the frame portion 22 of the intermediate substrate 21, and the lead portion 40A of the x-axis electrode 34A extends from the second contact portions 38A, down along the long side 49B of the frame portion 22, across half of the other short side 51B of the frame portion 22, and across the tail portion 59 of the intermediate spacer 20. The other x-axis electrode 34B is formed in a general "T"-shaped configuration, and includes second contact portions 38B that extend along the length of the short side 51B of the frame portion 22. The lead portion 40B of the x-axis electrode 34B extends from a central point along the length of the second contact portions 38B, and across the tail portion 59 of the intermediate spacer 20.

The x-axis electrodes 34A, 34B are positioned so that they do not coincide with, i.e., identically overlie, the y-axis electrodes 30A, 30B. As illustrated, the second contact portions 38A, 38B of the x-axis electrodes are preferably applied at the locations 48 (see FIGS. 4A and 4B), respectively, where no dielectric layer was applied. Application of the second contact portions 38A, 38B of the x-axis electrodes in this manner may be preferable so as to minimize the thickness of the intermediate spacer 20. As noted above, because the top membrane 14 of the switch 10 is depressed through the central aperture 24 of the intermediate spacer 20 to contact the bottom membrane 12, the thickness of the intermediate spacer 20 is preferably kept to a minimum.

While it has been described that the y-axis electrodes 30A, 30B and the x-axis electrodes 34A, 34B are applied in two separate steps, it should be understood that both the y-axis and x-axis electrodes may be applied simultaneously in one step. For example, if sufficient space is available on the intermediate substrate 21 to accommodate all electrodes without interfering with each other, it may be advantageous to apply all electrodes on the substrate at once.

Figure 6A:
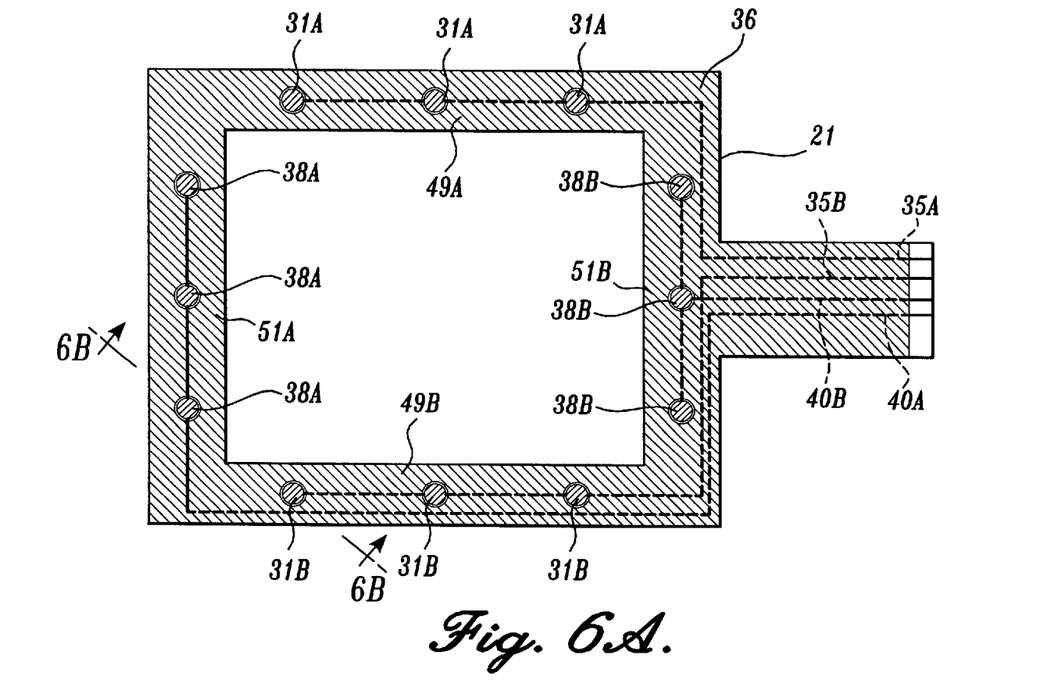
Figure 6B:
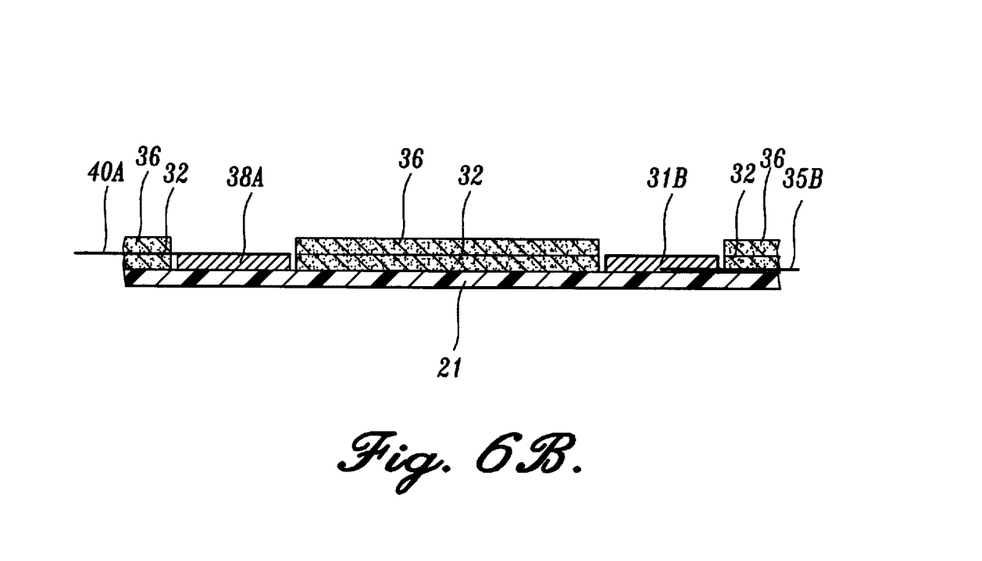

Next, referring to FIGS. 6A and 6B, optionally, a second dielectric layer 36 is applied over the upper surface 28 of the intermediate substrate 21. At this time, the dielectric layer 36 is formed while leaving both the first contact portions 31A, 31B of the y-axis electrodes and the second contact portions 38A, 38B of the x-axis electrodes exposed. As with the first dielectric layer 32, application of the second dielectric layer 36 is optional, but may be preferable in order to ensure insulation of the lead portions 40A, 40B of the x-axis electrodes.

Figure 7A:
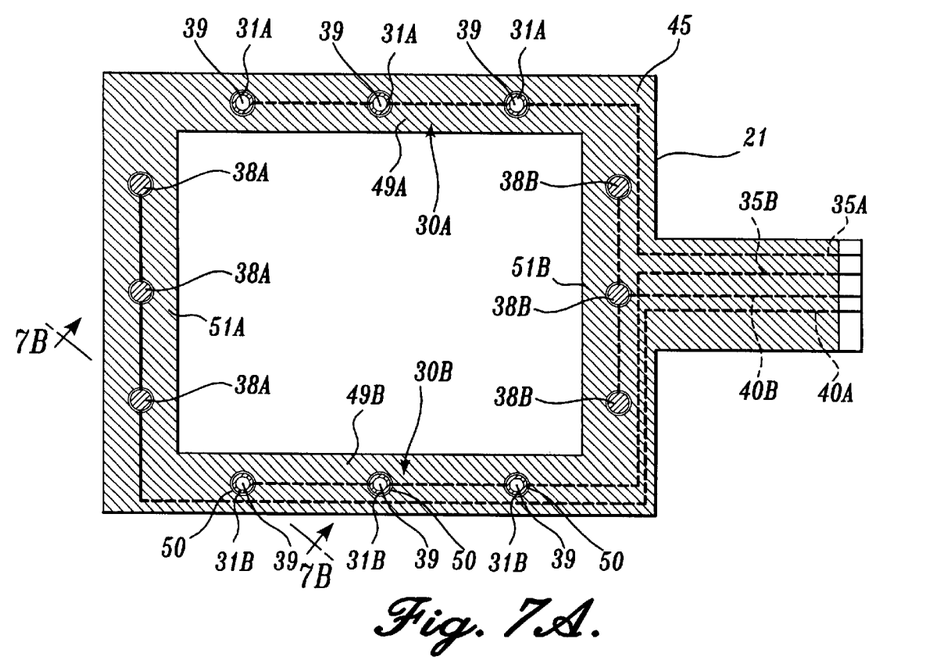
Figure 7B:
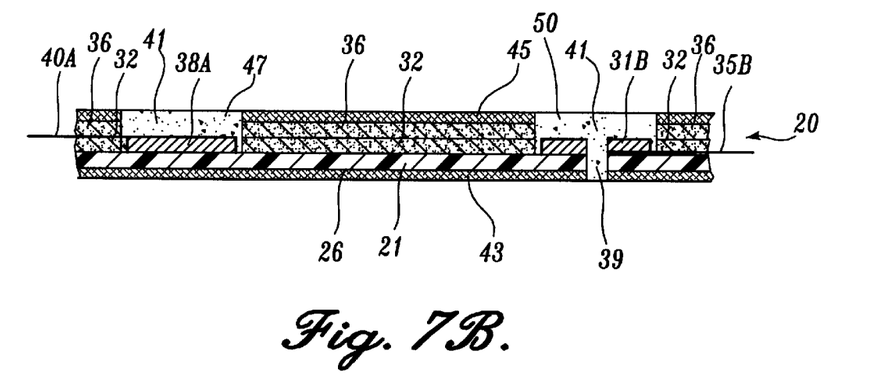

Thereafter, referring to FIGS. 7A and 7B, preferably, the intermediate substrate 21 heretofore constructed is sandwiched between the lower adhesive layer 43 and the upper adhesive layer 45. Referring additionally to FIG. 2, the upper adhesive layer 45 preferably includes at least one predefined first aperture 50 that is adapted to overlie the first contact portion 31A, 31B of the y-axis electrodes 30A, 30B, and at least one predefined second aperture 47 that is adapted to overlie the second contact portion 38A, 38B of the x-axis electrode 34A, 34B. The lower adhesive layer 43 does not need to include any predefined holes. After the intermediate substrate 21 and the lower and upper adhesive layers 43, 45 are assembled, at least one hole 39 is punched through each of the first contact portions 31A, 31B of the y-axis electrodes 30A, 30B, through the intermediate substrate 21 and the lower adhesive layer 43, using any suitable punching device, preferably a precision steel tool. The hole 39 has a cross-sectional area that is smaller than that of the first contact portion so that the hole 39 is surrounded by the conductive material that forms the first contact portion. Next, conductive epoxy material 41 is poured into each first aperture 50 through the upper adhesive layer 45 and hole 39 through the intermediate substrate 21 and the lower adhesive layer 43 to provide an electrical conduction path between each of the first contact portions 31A, 31B (hence, the y-axis electrodes 30A, 30B) and the lower adhesive layer 43. Conductive epoxy 41 is also poured into the predefined second apertures 47 defined through the upper adhesive layer 45 to provide an electrical conduction path between each of the second contact portions 38A, 38B (hence, the x-axis electrodes 34A, 34B) and the upper adhesive layer 45.

The epoxy material 41 not only provides an electrical conduction path between the first contact portions 31A, 31B, of the y-axis electrodes 30A, 30B and the lower adhesive layer 43, and between the second contact portions 38A, 38B of the x-axis electrodes 34A, 34B and the upper adhesive layer 45, but advantageously also serves as a bond amongst various layers and components forming the intermediate spacer 20. One example of the epoxy material 41 suitable for use in the present invention is Flexible Silver Conductive Epoxy 3882, available from Loctite Corporation of Hartford, Conn. Other conductive epoxy material, such as silver-carbon blend epoxy, nickel epoxy and gold epoxy may also be used.

A preferred embodiment, as described above, provides an efficient method of forming an intermediate spacer because both the y-axis and x-axis electrodes are applied on the same upper surface 28 of the intermediate substrate 21. This embodiment is also efficient because the intermediate substrate 21 and the lower and upper adhesive layers 43, 45 are first assembled together, and then the hole(s) 39 are defined through the intermediate substrate 21 and the lower adhesive layer 43 at once and the conductive epoxy material 41 filled into the apertures 47 and the apertures 50 and holes 39. The conductive epoxy material 41 may be dispensed manually or, again preferably, by an automated robot.

The lower and upper adhesive layers 43, 45 may be applied by any conventional method, such as by silk-screening onto the corresponding portions of the intermediate substrate 21. Thus, in the embodiment illustrated in FIG. 7B, adhesive can be silk-screened over the lower surface 26 of the intermediate substrate 21 and over the second dielectric layer 36.

However, in order to control placement of the adhesive, it has been found preferable to apply both the lower and upper adhesive layers 43, 45 as films sandwiched between sheets of wax-impregnated paper transfer tape. To apply the adhesive, one paper transfer tape is peeled off and the exposed adhesive is pressed onto the corresponding portion of the intermediate substrate 21. The second paper transfer tape is then peeled off and the intermediate spacer 20 is joined to the corresponding bottom or top membrane 12 or 14. One suitable nonconductive adhesive film suitable for use in the present invention has been found to be the transfer tape sold under part number SCOTCH® 467 by the 3M Company of St. Paul, Minn.

To assist in proper placement of the various layers of the intermediate spacer 20, the preferred method of fabrication of the intermediate spacer 20 is to assemble the various layers, including the intermediate substrate 21, and the lower and upper adhesive layers 43, 45 prior to cutting the intermediate spacer 20 from a sheet of stock material. Thus, after all the layers are applied, with the upper adhesive layer 45 including at least one first aperture 50 and second aperture 47 applied with the outer protective paper transfer tape retained thereon, and with the lower adhesive layer 43 applied again with the outer protective paper transfer tape retained thereon, the intermediate spacer 20 is cut from the stock material, such as by die-stamping. Preferably, the intermediate spacer 20 is cut to form the central aperture 24 at the same time, or immediately before or after, the holes 39 are punched through the intermediate substrate 21 and the lower adhesive layer 43, so that the entire cutting operation may be performed at the same time. The outer sheets of paper transfer tape can then be removed from the adhesive layers, and the intermediate spacer 20 can be secured between the bottom membrane 12 and the top membrane 14.

Referring specifically to FIGS. 2, 7A, and 7B, when the intermediate spacer 20 is secured between the bottom and top membranes 12, 14, the holes 39 through the lower adhesive layer 43 filled with conductive epoxy 41 contact the bus bar 17A, 17B provided on the upper surface 16 of the bottom membrane 12. Similarly, the second apertures 47 through the upper adhesive layer 45 filled with conductive epoxy 41 contact the bus bar 19A, 19B provided on the lower surface 18 of the top membrane 14. Thus, the first contact portions 31A, 31B of the y-axis electrodes 30A, 30B electrically connect with the upper conductive surface 16 of the bottom membrane 12, and the second contact portions 38A, 38B of the x-axis electrodes 34A, 34B electrically connect with the lower 15 conductive surface 18 of the top membrane 14.

When the membrane switch 10 is assembled, the raised dielectric projections 57 provided on the upper conductive surface 16 of the bottom membrane 12 normally prevent the conductive surfaces 16 and 18 of the bottom and top membranes 12 and 14, respectively, from contacting each other through the aperture 24 of the intermediate spacer 20. However, the top membrane 14 can be depressed through the central aperture 24 of the intermediate spacer 20 to contact the bottom membrane 12 during operation of the membrane switch 10.

Although the present invention has been shown and described above for construction of a four-wire analog membrane switch, it should be apparent that the present invention is also well suited for the construction of other types of analog membrane switches, such as three-wire, five-wire, and eight-wire switches.

Figure 8:
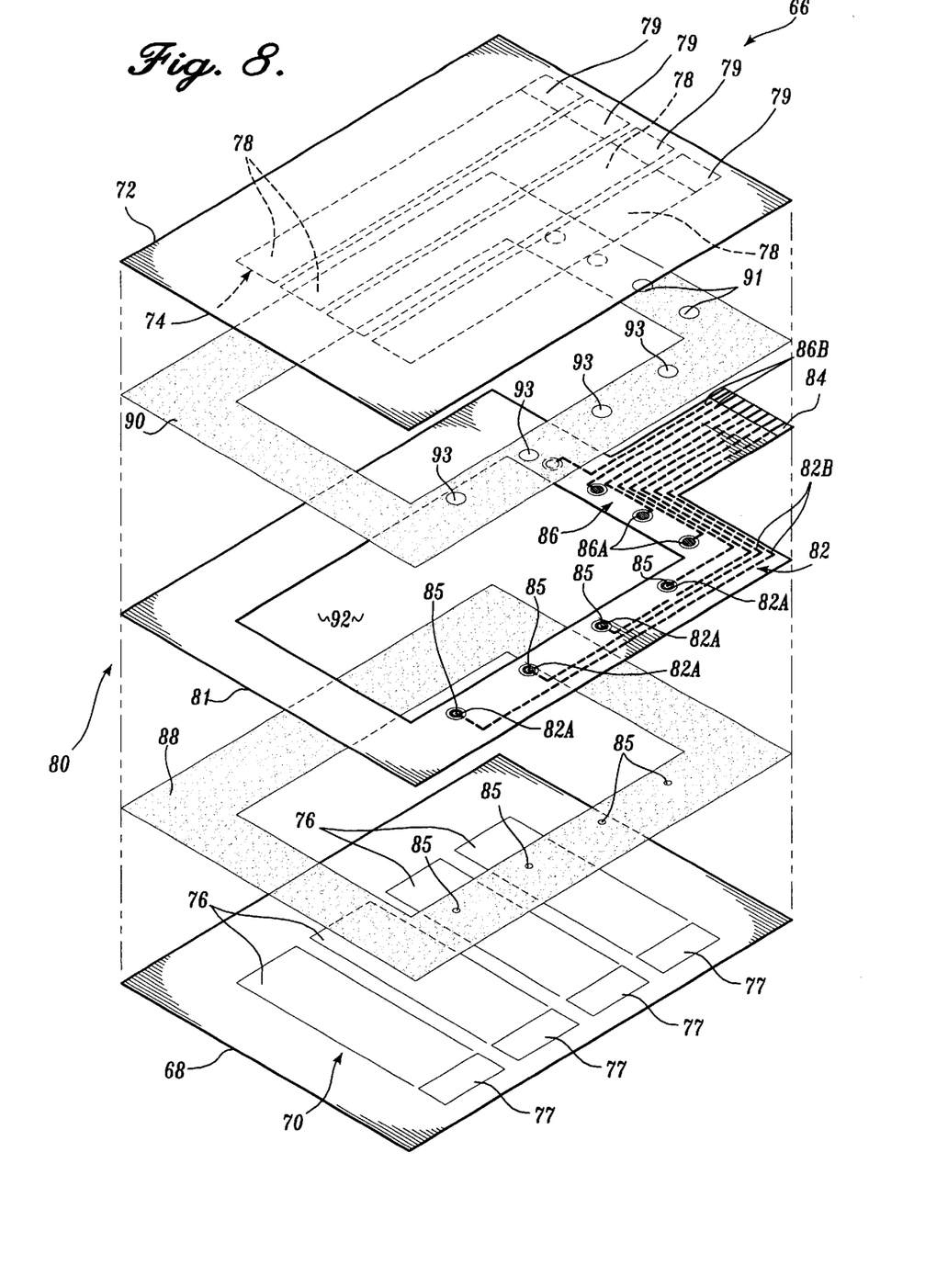
FIG. 8 provides an exploded view of an alternate embodiment of a digital membrane switch constructed in accordance with the present invention.

In addition to analog membrane switches, the present invention may also be used to construct digital membrane switches. A digital membrane switch 66 constructed in accordance with the present invention is illustrated in FIG. 8. Use of the present invention in digital membrane switches, again, will afford an increase in production efficiency.

The digital membrane switch 66 illustrated in FIG. 8 is similarly constructed in many respects to the previously described analog membrane switch 10. Thus, those aspects that are the same will not be described in great detail. The digital membrane switch 66 includes a bottom membrane 68 having an upper, conductive coated surface 70, and a top membrane 72 having a lower, conductive coated surface 74. The conductive coating on the upper surface 70 of the bottom membrane 68 is etched using conventional techniques to form a series of short parallel conductive strips 76. The bottom conductive surface 74 of the top membrane 72 is similarly etched to form a corresponding number of long parallel conductive strips 78 that are disposed perpendicularly to the short conductive strips 76. When the top membrane 72 overlies the bottom membrane 68, the conductive strips 76, 78 cross to form a matrix of overlapping conductive squares that can be used to locate a position on the membrane switch corresponding to a particular matrix location.

Preferably, each of the short conductive strips 76 includes a bus bar 77 provided at one of its short sides. The bus bar 77 is made of material having less resistivity than the conductive material forming the short conductive strips 76, similarly to the bus bars 17A, 17B, 19A, 19B applied in the analog membrane switch 10 of the present invention described above. Likewise, each of the long conductive strips 78 preferably includes a bus bar 79 provided at one of its short sides.

An intermediate spacer 80 is secured between the bottom membrane 68 and the top membrane 72. A plurality of y-axis electrodes 82 are formed on the upper surface of an intermediate substrate 81 forming the intermediate spacer, with one y-axis electrode 82 corresponding to each of the short conductive strips 76 formed on the bottom membrane 68. Each of the y-axis electrodes 82 includes a first contact portion 82A and a lead portion 82B, which extends from the first contact portion 82A across a tail 84 of the intermediate spacer 80. The first contact portions 82A of the y-axis electrodes 82 are arranged so as to overlie and electrically connect with the bus bars 77 provided on the bottom membrane 68, respectively, once the digital membrane switch 66 is assembled. A plurality of x-axis electrodes 86 are formed also on the upper surface of the intermediate substrate 81. Each x-axis electrode 86 corresponds to one of the long conductive strips 78 provided on the top membrane 72. Again, each x-axis electrode 86 includes a second contact portion 86A and a lead portion 86B extending over the tail 84. As with the analog membrane switch, first and second dielectric layers may be applied depending on the specific application and needs, for example, the space available on the intermediate substrate 81 to accommodate various electrodes.

The intermediate substrate 81 is then sandwiched between a lower adhesive layer 88 and an upper adhesive layer 90 to complete the intermediate spacer 80. The upper adhesive layer 90 includes a plurality of first apertures 93 that are adapted to overlie the first contact portions 82A of the y-axis electrodes 82 provided on the intermediate substrate 81 and a plurality of second apertures 91 that are adapted to overlie the second contact portions 86A of the x-axis electrodes 86 provided on the intermediate substrate 81. The lower adhesive layer 88 need not include predefined holes. After the intermediate spacer 20 is thus assembled, a plurality of holes 85 are punched through the first contact portions 82A of the y-axis electrodes 82, through the intermediate substrate 81 and the lower adhesive layer 88. The cross-sectional area of each hole 85 is smaller than that of the first contact portion 82A, so that the hole 85 is surrounded by the conductive material forming the contact portion 82A. Thereafter, conductive epoxy material is poured into the first aperture 93 and the hole 85 to provide an electrical conduction path between each of the first contact portions 82A of the y-axis electrodes 82 and the lower adhesive layer 88. Likewise, conductive epoxy material is poured into the second apertures 91 predefined through the upper adhesive layer 90 to provide an electrical conduction path between each of the second contact portions 86A of the x-axis electrodes 86 and the upper adhesive layer 90.

When the intermediate spacer 80 is secured between the bottom membrane 68 and the top membrane 72, the first contact portions 82A of the y-axis electrodes 82 are electrically connected with the short conductive strips 76, or more specifically with the bus bars 77, respectively. Similarly, the second contact portions 86A of the x-axis electrodes 86 are electrically connected with the long conductive strips 78, or more specifically with the bus bars 79, respectively.

Just as described previously for the analog membrane switch 10, it is most preferable to assemble the intermediate spacer 20, including the intermediate substrate 81 and the lower and upper adhesive layers 88, 90, prior to cutting the intermediate spacer 80 to form a central aperture 92 therein.

The digital membrane switch 66 is illustrated as having four short conductive strips 76 and four long conductive strips 78. However, it should be readily apparent that larger or smaller digital membrane switches with greater or fewer conductive strips can also be advantageously produced with the present invention.

The analog or digital membrane switch of the present invention and method for producing the same result in a significant decrease in the amount of labor required to produce an intermediate spacer and, hence, a membrane switch. Because both x- and y-axes' electrodes are applied on the same side of a third, intermediate substrate to form an intermediate spacer, the present method eliminates the labor formerly required to apply electrodes on both sides of an intermediate substrate. As a result, a significant increase in overall production efficiency in the manufacturing of a membrane switch is achieved. Also, because all electrodes are applied on the same side of an intermediate substrate, the reliability of a final membrane switch product is significantly improved.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of forming a membrane switch, comprising:
   (a) providing a first substrate having a first electrically conductive surface;
   (b) providing a flexible second substrate having a second electrically conductive surface;
   (c) providing an intermediate spacer defining a central aperture, the second substrate being depressible through the central aperture of the intermediate spacer to contact the first substrate, providing the intermediate spacer comprising:
      (i) providing a dielectric third substrate including third and fourth surfaces,
      (ii) applying at least one first electrode including at least one first contact portion on the fourth surface of the third substrate,
      (iii) applying at least one second electrode including at least one second contact portion on the fourth surface,
      (iv) applying a first adhesive layer to the third surface of the third substrate,
      (v) applying a second adhesive layer to the fourth surface of the third substrate, the second adhesive layer defining at least one first aperture adapted to overlie the at least one first contact portion of the at least one first electrode on the fourth surface, the second adhesive layer further defining at least one second aperture adapted to overlie the at least one second contact portion of the at least one second electrode on the fourth surface,
      (vi) defining at least one hole extending through the at least one first contact portion of the at least one first electrode between the third substrate and the first adhesive layer, the hole having a cross-sectional area that is smaller than that of the first contact portion,
      (vii) pouring conductive epoxy material into the first aperture and the hole, the conductive epoxy providing an electrical conduction path between the first contact portion and the first adhesive layer, and
      (viii) pouring conductive epoxy material into the second aperture defined through the second adhesive layer to overlie the second contact portion, the conductive epoxy providing an electrical conduction path between the second contact portion and the second adhesive layer; and
   (d) securing the intermediate spacer between the first surface of the first substrate and the second surface of the second substrate, the first adhesive layer of the intermediate spacer being associated with the first conductive surface of the first substrate to maintain the first electrode in electrical contact with the first conductive surface, and the second adhesive layer of the intermediate spacer being associated with the second conductive surface of the second substrate to maintain the second electrode in electrical contact with the second conductive surface.

2. The method of claim 1, wherein step (c) comprises defining the central aperture of the intermediate spacer after the intermediate spacer is assembled by performing substeps (c)(i) through (c)(v).

3. The method of claim 1, wherein step (c) of providing the intermediate spacer further comprises, after the at least one first electrode is applied on the fourth surface in substep (c)(ii), applying a first dielectric layer over the fourth surface without covering the at least one first contact portion.

4. The method of claim 3, wherein the first dielectric layer is applied over the fourth surface, further without covering at least one location where the at least one second contact portion is to be applied, and substep (c)(iii) comprises applying the second contact portion at the location where no first dielectric layer is applied.

5. The method of claim 4, further comprising, after both the at least one first electrode and the at least one second electrode are applied on the fourth surface in substeps (c)(ii) and (c)(iii), applying a second dielectric layer over the fourth surface without covering the first and second contact portions.

6. The method of claim 1, wherein step (c) of providing the intermediate spacer further comprises, after both the at least one first electrode and the at least one second electrode are applied on the fourth surface in substeps (c)(ii) and (c)(iii), applying a dielectric layer over the fourth surface without covering the first and second contact portions.

7. The method of claim 1, wherein the first and second electrodes are formed of silver ink and the conductive epoxy material is selected from a group consisting of silver epoxy, silver-carbon blend epoxy, nickel epoxy, and gold epoxy.

8. The method of claim 1, wherein:
the first electrically conductive surface of the first substrate includes a first set of parallel edges and a second set of parallel edges that are orthogonal to the first set of parallel edges, at least one of the first set of parallel edges including a first conductive bus bar extending the length of the first parallel edge, and the at least one first contact portion of the first electrode being electrically connected to the first conductive bus bar; and
the second electrically conductive surface of the second substrate includes a first set of parallel edges and a second set of parallel edges that are orthogonal to the first set of parallel edges, at least one of the second set of parallel edges including a second conductive bus bar extending the length of the second parallel edge, and the at least one second contact portion of the second electrode being electrically connected to the second conductive bus bar.

9. The method of claim 8, wherein the first and second conductive bus bars are formed of material having less resistivity than the material forming the first and second electrically conductive surfaces.

10. The method of claim 9, wherein the bus bars are formed of silver.

11. The method of claim 1, wherein substeps (c)(vii) and (c)(viii) comprise pouring conductive epoxy material into the hole and the aperture using an automated robot.

12. The method of claim 1, wherein the first and second adhesive layers are provided in the form of adhesive films.

13. The method of claim 1, wherein the first and second adhesive layers are silk-screened onto the third substrate.

14. The method of claim 1, wherein substeps (c)(ii) and(c)(iii) are performed simultaneously.

* * * * *